United States Patent
Minami et al.

[11] Patent Number: 5,950,675
[45] Date of Patent: *Sep. 14, 1999

[54] BACKFLOW PREVENTION APPARATUS FOR FEEDING A MIXTURE OF GASES

[75] Inventors: Yukio Minami; Nobukazu Ikeda; Manohar L. Shrestha, all of Osaka; Satoshi Kagatsume, Yamanashi, all of Japan

[73] Assignees: Fujikin Incorporated, Osaka; Tokyo Electron Limited, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,763

[22] Filed: Feb. 13, 1997

[30] Foreign Application Priority Data

Feb. 15, 1996 [JP] Japan ................................... 8-027500
Jan. 13, 1997 [JP] Japan ................................... 9-003667

[51] Int. Cl.[6] ....................................... F17D 1/02
[52] U.S. Cl. .......................... 137/606; 251/331; 118/715; 427/255.1
[58] Field of Search ................ 137/3, 606, 896, 137/897, 10, 602, 605, 607, 599, 4, 5, 6, 7; 118/715; 251/331; 427/248.1, 255.1, 255.3

[56] References Cited

U.S. PATENT DOCUMENTS

| | | |
|---|---|---|
| 2,774,364 | 12/1956 | Brobeil ......................................... 137/3 |
| 3,385,680 | 5/1968 | Feld ............................................. 137/3 |
| 3,702,619 | 11/1972 | Son .............................................. 137/3 |
| 3,750,687 | 8/1973 | Williams .................................. 137/606 |
| 3,830,256 | 8/1974 | Cox ....................................... 137/606 X |
| 4,257,439 | 3/1981 | Mayeaux .................................. 137/606 |
| 4,275,752 | 6/1981 | Collier ..................................... 137/10 |
| 4,526,188 | 7/1985 | Olsson ........................................ 137/3 |
| 5,035,767 | 7/1991 | Nishizawa ........................... 118/715 X |
| 5,192,269 | 3/1993 | Poli .......................................... 137/606 |
| 5,576,060 | 11/1996 | Hirai ..................................... 427/255.1 |
| 5,755,428 | 5/1998 | Ollivier .................................. 251/331 |

*Primary Examiner*—Denise L. Ferensic
*Assistant Examiner*—Ramyar Farid
*Attorney, Agent, or Firm*—Griffine, Butler, Whisenhunt & Szipl, LLP

[57] ABSTRACT

An apparatus for mixing and feeding plural gases flowing at different mass flow rates and having different molecular weights includes a plurality of gas feed lines connected to a mixing region having an outlet for feeding a mixture of the gases to a semiconductor production apparatus. The gas feed line carrying the lowest-flow-rate gas is connected to the mixing region at a location farther from the outlet than where any other feed line is connected to the mixing region. Feed lines carrying gases other than the lowest-flow-rate gas are connected to the mixing region according to (1) the relative mass flow rates of the gases carried by the lines (2) the relative molecular weights of the gases carried by the lines or (3) the product of the respective gas flow rates and molecular weights of the gases. At least the line carrying the lowest-flow-rate gas is provided with an apparatus for increasing the velocity of the gas flowing therein prior to entry of the gas into the mixing region.

4 Claims, 8 Drawing Sheets

BACKFLOW PREVENTION APPARATUS FOR FEEDING A MIXTURE OF GASES

FIELD OF THE INVENTION

The present invention is intended for use primarily in semicondutor manufacturing and other processes and relates to a method and apparatus for mixing plural gases and feeding the mixture of gases to an outlet. The invention prevents the back flow or back diffusion of a gas from a high-flow-rate gas feed line into a low-flow-rate feed line when feeding a mixture of gases consisting of different kinds of gases into an apparatus used in the production of semiconductors.

BACKGROUND OF THE INVENTION

Manufacturing processes for producing semiconductors frequently use a gas containing a highly reactive gas such as silane gas which, upon contact with air, is deposited to form a solid ($SiO_2$). FIG. 11 illustrates a typical apparatus for dry etching, for example, Si wafers during the manufacture of semiconductors. An apparatus A mixes the gases $H_2$, $O_2$ and $CF_4$ and feeds the resulting mixture of gases via a tube T to an evacuated process chamber (etching chamber) C, where Si wafers (not shown) are subjected to etching treatment.

In FIG. 11, $MFC_1$, $MFC_2$ and $MFC_3$ are mass flow controllers, $V_1$, $V_2$, and $V_3$ are valves, T is a transport tube, R is a dry pump, $V_M$ is a main valve, $Q_1$ and $Q_2$ are traps, and Y is a mechanical booster pump.

The gases $H_2$, $O_2$ and $CH_4$ are fed from sources (not shown) to respective ones of the mass flow controllers $MFC_1$–$MFC_3$ via a respective one of feed lines $L_1$–$L_3$. The output flows of the mass flow controllers are applied to respective ones of the valves $V_1$–$V_3$ and the outputs of the valves are all connected to the tube T. The mass flow rate of $CF_4$ is normally greater than the mass flow rates of $H_2$ and $O_2$. Heretofore, it has been thought that the back flow of $CF_4$ gas into the $H_2$ or $O_2$ valves $V_1$ and $V_2$ does not take place because the pressure P of each gas applied to the gas feed lines $L_1$ and $L_2$ is at, or greater than, atmospheric pressure while the system (chamber C) into which the mixture of gases is fed is evacuated.

In fact, however, the back flow of the high-flow-rate line gas into the low-flow-rate line gas occurs sometimes in, for example, an apparatus for dry etching a film of silicon oxide. The back flow gas works to form a reaction product in the low-flow-rate gas feed line and the reaction product causes further problems such as leakage in the valve or clogging of the mass flow controller in the low-flow-rate gas feed line. In particular, the problem of back flow becomes significant where the mass flow rate of one of the gases being mixed is extremely low.

To determine what factors affect back flow, a gas mixing and feeding apparatus A was connected to a sampling apparatus S as shown in FIG. 6 and several tests were conducted using test procedures similar to procedures as described later.

The gases He, $H_2$ and $N_2$ were applied to lines $L_1$, $L_2$ and $L_3$, respectively. In a first test, pressure regulators $P_1$–$P_3$ and mass flow controllers $MFC_1$–$MFC_3$ were set to provide primary side pressures and mass flow rates as shown in Table I. The purpose of this test was to determine whether He in the high-flow-rate line $L_1$ (that is, high with respect to line $L_3$) flows backward into $N_2$ in the low-flow-rate line $L_2$.

TABLE I

| LINE NO. | TYPE OF GAS | PRIMARY SIDE PRESSURE ($kgf/cm_2G$) | FLOW RATE (cc/min) |
| --- | --- | --- | --- |
| $L_1$ | He | 1 | 100 |
| $L_2$ | $H_g$ | 1 | 200 |
| $L_3$ | $N_g$ | 1 | 3 |

The test confirmed that He in the high-flow rate line $L_1$, does, in fact, flow backward into the $N_2$ in the low-flow-rate line $L_3$. Variation of the gas feed parameters showed that this back flow occurs when the flow rate of $N_2$ is 5 cc/min. or less in the low-flow-rate line $L_3$.

It was further found that the maximum level of He of the back flow gas is about 90 ppm when $MFC_3$ in the low-flow-rate line $L_3$ was set at its minimum control value of 2.0 cc/min.

Further findings from the results of these tests were:

(1) the back flow becomes stabilized if the gases are introduced for 30 seconds or longer.
(2) the back flow rate is almost the same irrespective of the order in which valve $V_1$, $V_2$ and $V_3$ are operated.
(3) the back flow rate does not change even if the primary side pressures $P_1$, $P_2$ and $P_3$ are changed.
(4) the back flow rate is lower when the pressure at the exit side gas outlet Go at which the different kinds of gases meet in the gas feed line is at vacuum (VAC) than it is at atmospheric pressure (ATM).
(5) the back flow rate becomes lower when the length L between valve $V_3$ in the low-flow-rate line $L_3$ and the gas outlet Go is made longer to obtain a larger piping ratio L/D where L is the pipe length and D is the inside diameter of the pipe.
(6) the back flow of He becomes less when the velocity of the $N_2$ gas is raised by providing an orifice etc. in the low-flow-rate line $L_3$ at a location upstream of the gas outlet Go.
(7) the back flow rate is changed by changing the orientation of th low-flow-rate line $L_3$ relative to the gas outlet.

SUMMARY OF THE INVENTION

A primary object of the present invention is to provide a method and apparatus for mixing and feeding plural gases without back flow from a high-flow-rate feed line to a low-flow-rate feed line, thereby alleviating the problems of valve leakage and mass flow controller clogging in the low-flow-rate feed line.

An object of the present invention is to provide a method and apparatus for mixing plural gases from plural feed lines and feeding the resulting mixture of gases to an outlet without back flow of a higher-flow-rate gas into the feed line of a lower-flow-rate gas.

Another object of the invention is to provide a method of mixing plural gases from plural feed lines and feeding the resulting mixture of gases through a gas outlet to a region where the mixture of gases is used, the method being characterized in that the plural feed lines are connected to a mixing region with the line carrying the lowest-flow-rate gas being connected to the mixing region at a position farther from said outlet than the other feed lines.

A further object of the invention is to provide a method of mixing plural gases from plural feed lines in a mixing region and feeding the resulting mixture of gases through a gas outlet to a region where the mixture of gases is used, the method being characterized in that a ratio Q/S is substantially the same for each of the feed lines, where Q is the flow rate in a feed line and S is the sectional area of a passage in the feed line.

Still another object of the invention is to provide apparatus for carrying out a method as described above. In a preferred embodiment, the feed line carrying the lowest-flow-rate gas is connected to a mixing region at a location farther from the gas outlet than the other feed lines and the feed line carrying the highest-flow-rate gas, or the gas with the largest molecular weight, is connected to the mixing region at a location closer to the gas outlet than the other feed lines. A valve is provided at least in the feed line fartherest from the gas outlet. The valve has a gas outlet connected to a gas chamber by a gas passage, the sectional area of the passage being reduced to increase the velocity of the gas in the feed line. The valve may be a metallic diaphragm valve.

Other objects and advantages of the invention will become apparent upon consideration of the following description and the accompanying drawings.

DESCRIPTION OF PREFERRED EMBODIMENTS

Figure 6:
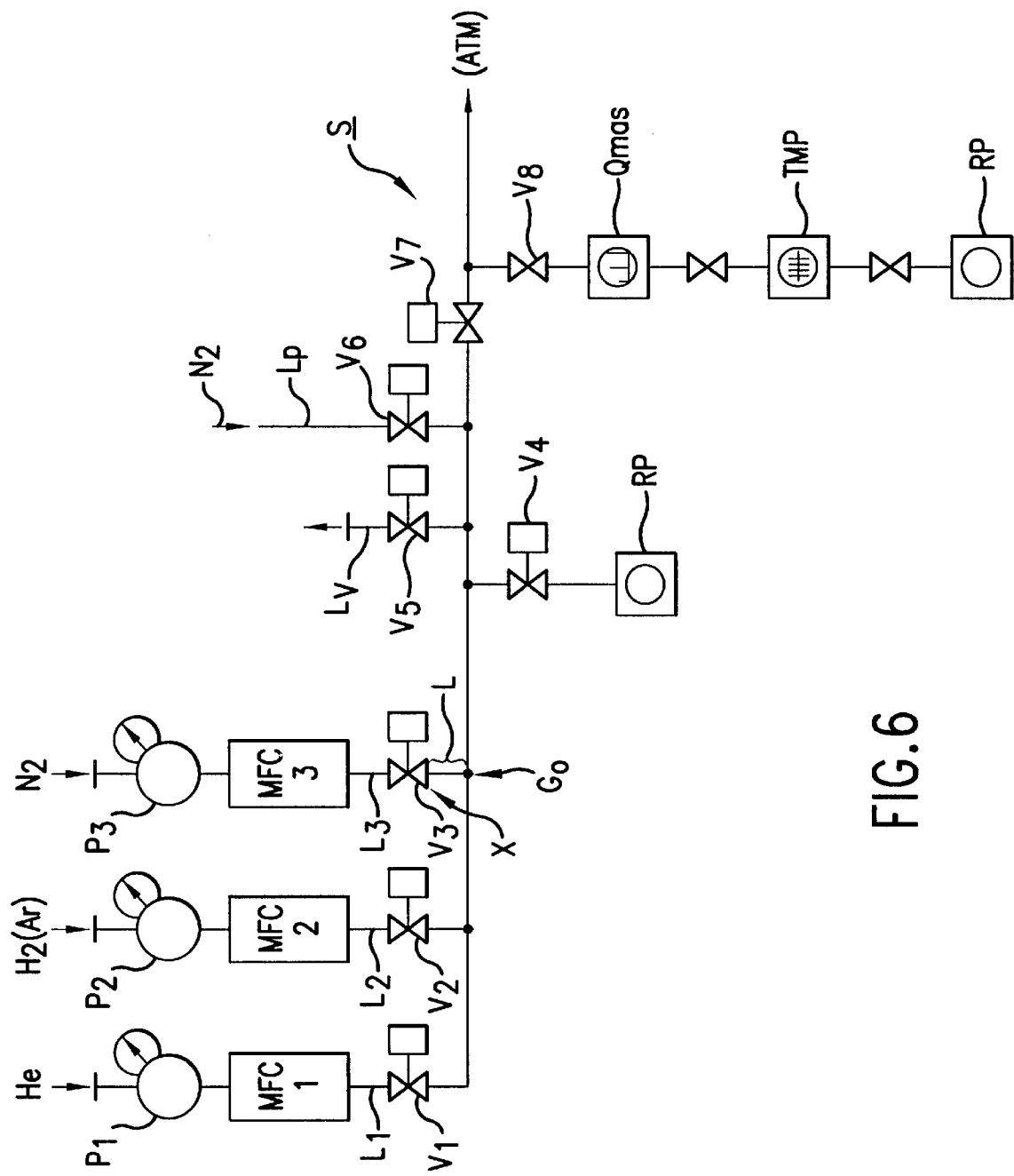
FIG. 6 illustrates an embodiment of apparatus for mixing and feeding gases and a sampling system for determining back flow.

FIG. 6 shows a unit devised by applicants for test purposes in conducting various back flow tests. The test unit includes an apparatus A for mixing plural gases and feeding the resulting mixture of gases to a sampling system S. The mixing and feeding apparatus A has plural gas feed lines $L_1$, $L_2$ and $L_3$ connected to a conduit or mixing region M where the gases are mixed, that is, combined into a single gas stream. The mixing region has a gas outlet Go through which the mixed stream of gases may flow to the sampling system S.

Each feed line $L_1$, $L_2$, $L_3$ is provided with a pressure regulator $P_1$, $P_2$, $P_3$, a mass flow rate controller $MFC_1$, $MFC_2$ or $MFC_3$, and a valve $V_1$, $V_2$ or $V_3$ which is opened to permit gas flow from a feed line into the mixing region M, or closed to block gas flow.

The sampling system S has a quadrupole mass spectrometer Qmas, a vacuum pump Rp, a vent line Lv, a purge line Lp and a plurality of valves $V_4$–$V_8$.

The following tests, using the testing apparatus of FIG. 6, were conducted in developing the invention.

Feed Rate Tests

In these tests, He, Ar, and $N_2$ were used as the gases applied to feed lines $L_1$, $L_2$ and $L_3$, respectively, and the following procedure was carried out to determine the effect of the mass flow rates in the feed lines on back flow into the low-flow-rate line $L_3$.

Step 1—Set Feed Line Parameters

The primary side pressure regulator P in each line was set at 1 kgf/cm$_7$G. The mass flow controllers were set to provide mass flow rates $Q_1$, $Q_2$ and $Q_3$ in lines $L_1$, $L_2$ and $L_3$ of 100 cc/min., 200 cc/min. and 10 cc/min., respectively.

Step 2—Purge Feed Lines

Gases were then purged from lines $L_1$, $L_2$ and $L_3$. Valves $V_1$–$V_3$ and $V_5$–$V_7$ were closed and valve $V_4$ was opened so that vacuum pump Rp evacuated the system. Then, valve $V_1$ was opened for 10 sec. to purge line $L_1$. The procedure was then repeated to purge lines $L_2$ and $L_3$ by successively opening valves $V_2$ and $V_3$.

Step 3—Set Outlet Pressure

At this point the valves $V_1$–$V_7$ were all closed. Valve $V_8$ was opened to return the evacuated system to atmospheric pressure with $N_2$ supplied over line Lp. Thereafter, valve $V_5$ was opened to purge $N_2$ through the vent line Lv.

Step 4—Backflow Operation

Valve $V_5$ was opened while valves $V_4$, $V_6$ and $V_7$ were closed. Valves $V_1$–$V_3$ were simultaneously opened and gases allowed to flow to the vent line Lv for a period of 30 sec. If back flow occured, He and Ar entered $L_3$ through valve $V_3$.

Step 5—Remove Remaining Gases

Valves $V_1$–$V_3$ and $V_5$–$V_7$ were closed and valve $V_4$ opened for 30 sec. to permit vacuum pump Rp to evacuate the remaining gases in the mixing and feeding apparatus downstream of the valves $V_1$–$V_3$.

Step 6—Prepare for Sampling

Valves $V_1$–$V_5$ and $V_7$ were closed (or were already closed) and valve $V_6$ was opened so that the pressure at gas outlet Go was returned to atmospheric pressure by $N_2$ from the purge line Lp. Valve $V_7$ was then opened to purge $N_2$ into the sampling system S.

Step 7—Confirm Background

To determine or confirm a background (BG) level of He and Ar in the $N_2$ purge gas, valve $V_8$ was opened and a measurement taken by the spectrometer Qmas.

Step 8—Confirm Back Flow

To determine or confirm back flow, the flow rate $Q_3$ in line $L_3$ was set for 10 cc/min., valve $V_8$ closed, and valve $V_3$ opened. When $V_3$ was opened, any He or Ar which back flowed through the valve during step 4, above, was purged by the $N_2$ flowing in feed line $L_3$. Since the valve $V_8$ was still open, the purged gases were analyzed by the spectrometer to determine back flow.

Step 9—Change Flow Rate and Repeat

The flow rate controller $MFC_3$ in feed line $L_3$ was set for a flow rate $Q_3$ of 3 cc/min. and steps 3 to 8 repeated.

Tests conducted as described above revealed that when the gas in the low-flow-rate line $L_1$ is $N_2$, there is a back flow of He gas from line $L_1$ whose flow rate is more than about 5 cc/min. The ratio of the high flow rate to the low flow rate (He, Ar and $N_2$ were fed to $L_1$, $L_2$ and $L_3$, respectively with flow rates of 100, 200 and 5 cc/min, respectively) was considered to play a part in the velocity of the back flow. In this regard, a flow velocity of 5.6 mm/s was attained at a mass flow rate of 5 cc/min using tubing having an internal diameter of 4.35 mm.

The tests confirmed that back flow occurs from either of the two high-flow-rate feed lines $L_1$ and $L_2$ into the low-flow-rate line $L_3$. The states (kind of gas and amount) of the back flow vary depending on the ratio of the flow rates in the high-flow-rate lines $L_1$ and $L_2$. Table II shows data obtained under standard conditions with gas outlet Go at atmospheric pressure, and under conditions where the flow rates in the high-flow-rate lines were changed. Table II indicates that the back flow increases as the flow rate in the high-flow-rate lines increases.

TABLE II

| Gas Species and Flow Rate In Each Line <cc/min> | | | | | | Maximum Level of Back Flow Gas <ppm> | |
| --- | --- | --- | --- | --- | --- | --- | --- |
| $L_1$ | | $L_2$ | | $L_3$ | | He | Ar |
| He | 100 | Ar | 200 | $N_2$ | 3 | 65.2 | ND |
| He | 3000 | Ar | 200 | $N_2$ | 3 | 234.4 | ND |
| He | 100 | Ar | 3000 | $N_2$ | 3 | ND | 63.8 |

In Table II, and in subsequent tables, the background level BG is designated as non-detectable (ND). The background level of He was 10 to 20 ppm and the background level of Ar was 20 to 30 ppm.

Position Tests

Tests conducted to determine the effect of the positioning of the low-flow-rate feed line indicate that it is preferable for the low-flow-rate line to be located farthest upstream form the gas outlet Go. That is, when $L_1$ carries the low-flow rate gas $N_2$, no back flow gas is detected in the $N_2$. The test results, shown in Table III, also confirm that the back flow increases with an increasing flow rate in the high-flow-rate lines.

TABLE III

| Gas Species and Flow Rate In Each Line <cc/min> | | | | | | Maximum Level of Back Flow Gas <ppm> | |
| --- | --- | --- | --- | --- | --- | --- | --- |
| $L_1$ | | $L_2$ | | $L_3$ | | He | Ar |
| He | 100 | $N_2$ | 3 | Ar | 200 | 67.6 | ND |
| He | 3000 | $N_2$ | 3 | Ar | 200 | 257.3 | ND |
| $N_2$ | 3 | Ar | 200 | He | 100 | ND | ND |
| $N_2$ | 3 | Ar | 200 | He | 3000 | ND | ND |

The results shown in Table III were obtained with the gas outlet Go at atmospheric pressure. Further tests (results in Table IV) indicate that the back flow from lines $L_1$ and $L_2$ into line $L_3$ tends to be less when the secondary side pressure at outlet Go is a vacuum than when it is at atmospheric pressure. The maximum level of Ar gas was below the background level in either case.

TABLE IV

| Gas Species and Flow Rate In Each Line <cc/min> | | | | | | Maximum Level Of Back Flow Gas <ppm> | |
| --- | --- | --- | --- | --- | --- | --- | --- |
| $L_1$ | | $L_2$ | | $L_3$ | | At Atmospheric | Under Vacuum |
| He | 100 | Ar | 200 | $N_2$ | 3 | 65.2 | ND |
| He | 3000 | Ar | 200 | $N_2$ | 3 | 234.4 | 44.2 |

Further testing showed that the back flow is less if the length of piping between the gas outlet Go and the outlet side of valve $V_3$ is made longer. That is, the back flow decreases as the piping ratio L/D is increased, where L is the length of the pipe between valve $V_3$ and outlet Go and D is the inside diameter of the pipe. Also, the back flow is decreased if an orifice gasket or passage with a restricted section or area is provided at the secondary or downstream side of the valve $V_3$ in the low-flow-rate line to increase the velocity of the gas flowing in to the piping section L.

Figure 7:
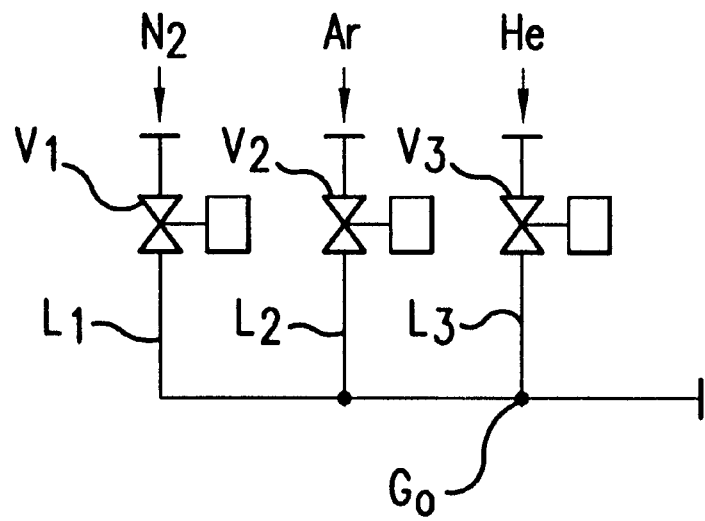
FIG. 7 illustrates a first piping arrangement in an apparatus for mixing and feeding plural gases.
Figure 8:
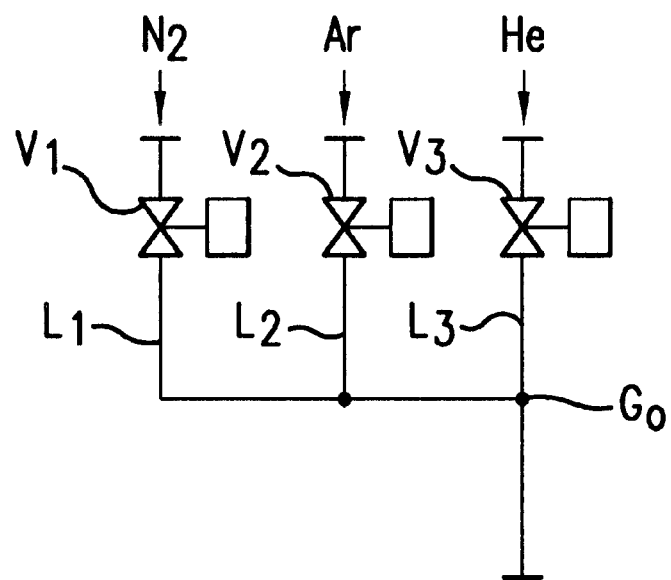
FIG. 8 illustrates a second piping arrangement in an apparatus for feeding and mixing plural gases.

Tests were conducted using the piping configurations of FIGS. 7 and 8. These configurations differ in that in FIG. 7 the outlet Go is directed at roughly a right angle to the direction of the piping joining valve $V_3$ to the mixing region, whereas in FIG. 8, outlet Go is aligned with the direction of the piping joining $V_3$ to the mixing region. The back flow tends to be less when the configuration of FIG. 8 is used, as shown in Table V.

TABLE V

| Gas Species and Flow Rate In Each Line <cc/min> | | | | | | Maximum Level of Back Flow Gas <ppm> | |
| --- | --- | --- | --- | --- | --- | --- | --- |
| $L_1$ | | $L_2$ | | $L_3$ | | FIG. 7 | FIG. 8 |
| He | 100 | Ar | 200 | $N_2$ | 3 | 65.2 | 22.1 |
| He | 3000 | Ar | 200 | $N_2$ | 3 | 234.4 | 131.1 |

The detected levels shown in Table V are for He. Ar was not detected in any case. Furthermore, when line $L_1$ rather than $L_3$ was made the low-flow-rate line the back flow of He was below the background level. Thus, the test results indicate that back flow is related to the molecular weight and flow rate of a gas in a line and the position of the line.

In a further series of tests, He was used in place $N_2$ as the gas for returning the system to atmospheric pressure. This permitted determination of the back flow of $N_2$ and Ar into the gas in the low-flow-rate line $L_3$. Generally speaking, it was found from these tests that back flow, on the whole, was greater when He was used as the low-flow-rate gas in line $L_3$ then when $N_2$ was used. The back flow is greater when the molecular weight of the low-flow-rate gas is smaller than the molecular weights of the higher-flow-rate gases. Even when different gases were used, the effect of parameters such as gas outlet pressure, position of the low-flow-rate line, etc. on back flow tended to remain the same. This tendency was easier to confirm when He was used as the low-flow-rate gas in line $L_3$.

In order to confirm the effect of the ratio between the flow rates in the high-flow-rate line $L_1$ and the low-flow-rate line $L_3$ on the back flow, back flows were compared under the conditions set forth in Table VI, using the flow configuration shown in FIG. 7.

TABLE VI

Gas Species and Flow Rate
In Each Line
<cc/min>

| $L_1$ High Flow Rate | | $L_2$ High Flow Rate | | $L_3$ Low Flow Rate | | Pressure At Gas Outlet |
|---|---|---|---|---|---|---|
| $N_2$ | 200 | Ar | 200 | He | 50 → 3 | ATM; Vacuum |
| $N_2$ | 1000 | Ar | 1000 | He | 100 → 3 | ATM; Vacuum |
| He | 200 | Ar | 200 | $N_2$ | 10 → 3 | ATM; Vacuum |

Figure 9:
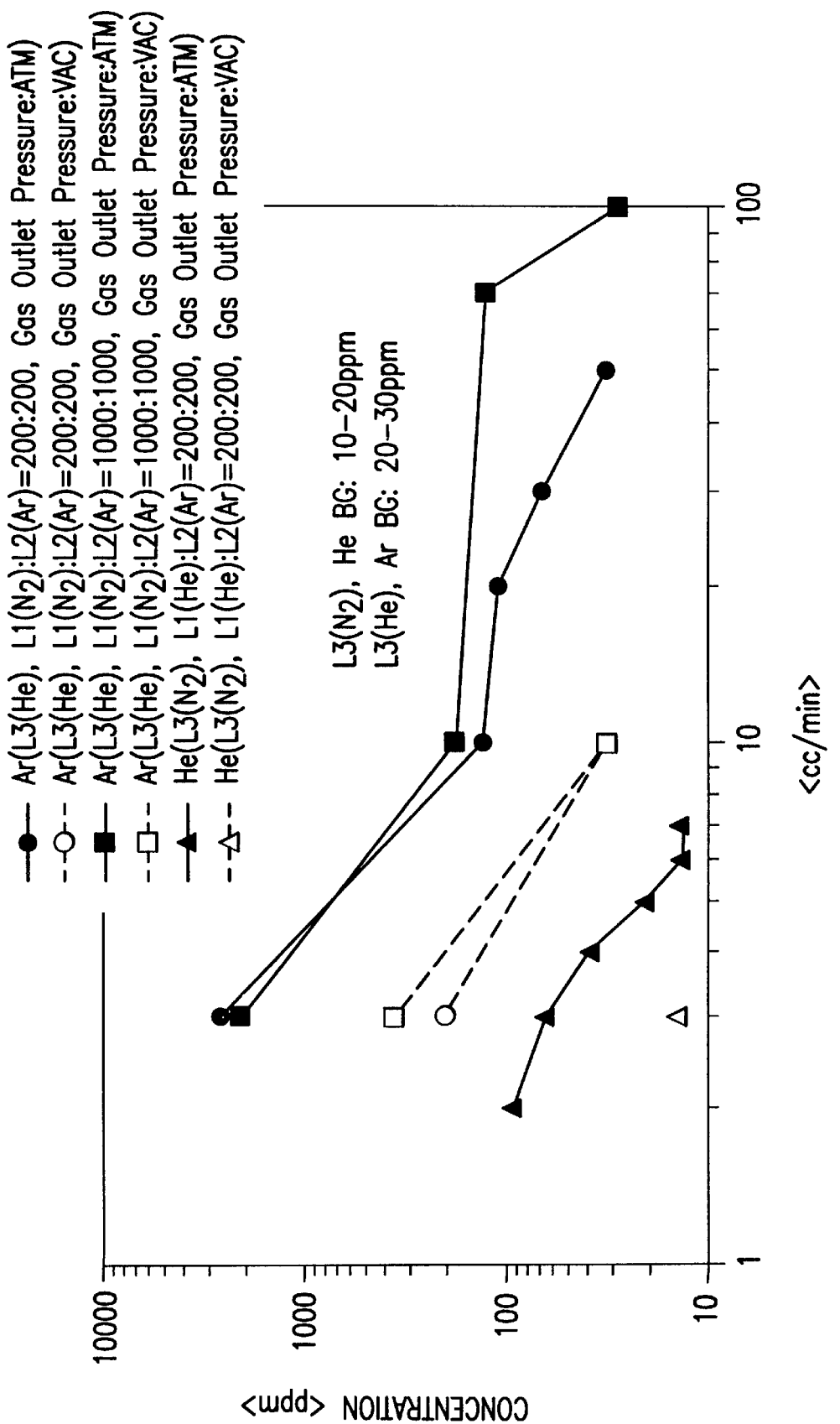
FIG. 9 is a graph illustrating the results of tests conducted on apparatus employing a gas feeding and mixing apparatus as shown in FIG. 7.

The results are shown in FIG. 9. When the gas in the low-flow-rate line was He and the flow rates of $H_2$ and Ar in the high-flow-rate-lines were increased from 200 to 1000 cc/min., the flow rate of He in the low-flow-rate line necessary to prevent back flow of Ar increased from 50 to 100 cc/min. When the gas in the low-flow-rate line was changed from He (m/e4) to $N_2$ (m/e 28) while the flow rate in the low-flow-rate lines remained at 200 cc/min., the flow rate in the low-flow-rate line necessary to prevent back flow changed from 50 to 6 cc/min. The results indicate that the magnitude of back flow becomes larger if the molecular weight of the gas in the low-feed-rate-line is smaller and a ratio of the flow rate in the high-flow-rate line to the flow rate in the low-flow rate line is larger.

In order to determine the effect that the position of the low-feed-rate line with respect to the two high-feed-rate lines has on back flow, back flow was measured under the conditions set forth in Table VII, using the configuration shown in FIG. 7.

TABLE VII

Gas Species And Flow Rate In Each Line
<cc/min>

| $L_1$ High Flow Rate | | $L_2$ High Flow Rate | | $L_3$ Low Flow Rate | | Pressure At Gas Outlet |
|---|---|---|---|---|---|---|
| $N_2$ | 200 → 1000 | Ar | 200 → 1000 | He | 3 | Atmospheric |
| Ar | 200 → 1000 | $N_2$ | 200 → 1000 | He | 3 | Atmospheric |

Figure 10:
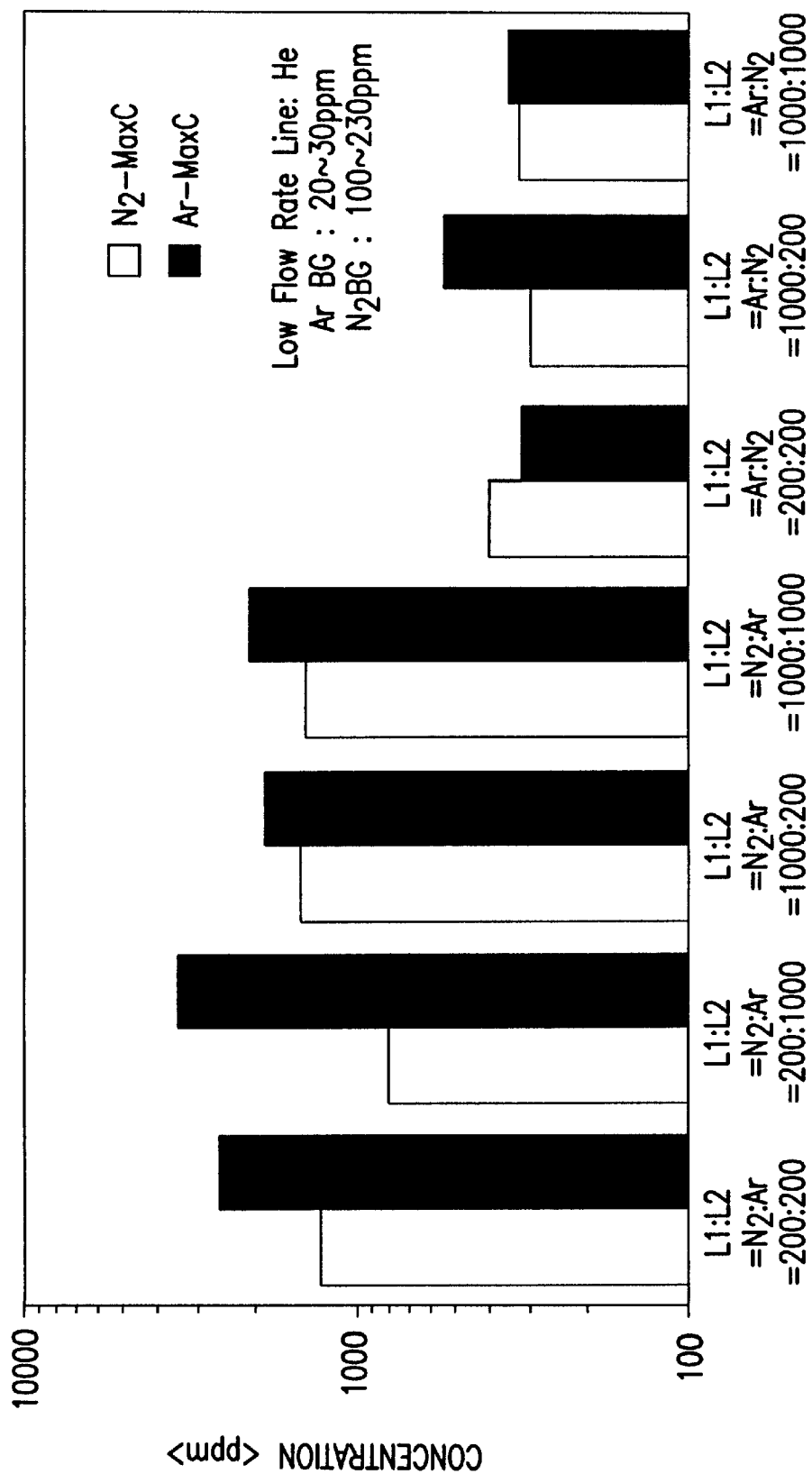
FIG. 10 is a graph illustrating the relationship between back flow and the kind of gas in the high-flow-rate feed line; and, FIG. 11 illustrates a gas feeding and mixing apparatus in a typical prior art apparatus used in the production of semiconductors.
Figure 11:
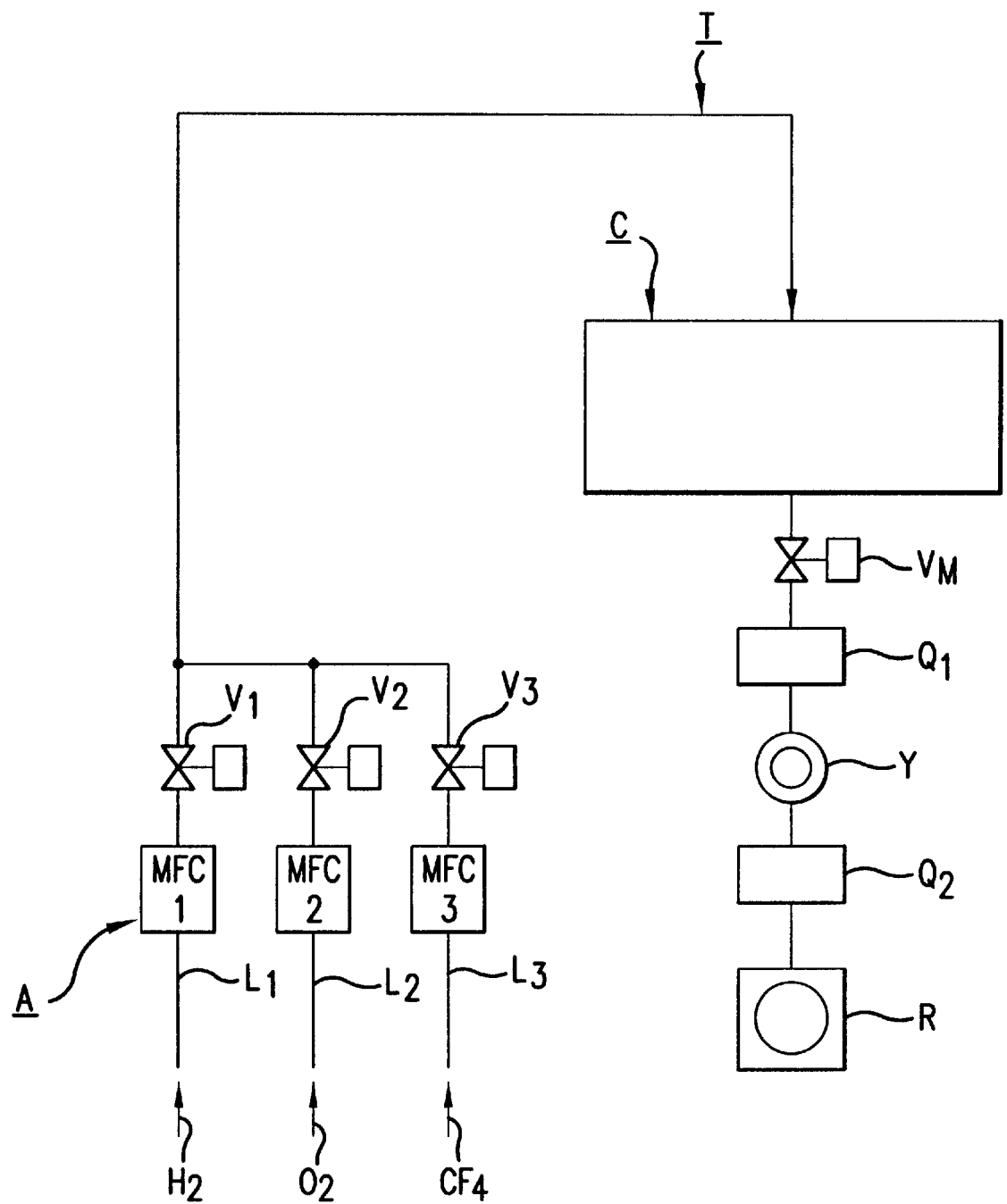

The results are shown in FIG. 10. When $N_2$ and Ar were used in lines $L_1$ and $L_2$, respectively, and the flow rate of Ar was changed, the maximum level of remaining Ar increased as the flow rate of Ar was increased, but the maximum level of the other remaining gas $N_2$ decreased. This tendency was observed even under other conditions, indicating that the residual amounts of the two gases from the high-flow-rate lines are affected by the flow rate of respective other high-flow-rate lines. When $N_2$ and Ar in the high-flow-rate lines $L_1$ and $L_2$ are switched, the maximum level of their remaining gases was relatively decreased. Regarding the position of the high-flow-rate line $L_1$ with respect to the low-flow-rate line $L_3$, the back flow tends to be prevented if the high-flow-rate line $L_1$ is positioned farther from the low-flow-rate line $L_3$ according to the molecular weight of the gas flowing in line $L_1$. This is, with plural high-flow-rate lines, the line feeding the highest molecular weight gas should be connected to the mixing region farthest from the low-flow-rate line.

The back flow tests described above confirm that in a gas feeding and mixing apparatus, such as in semiconductor manufacturing processes, where back flow should be prevented:

1) The low-flow-rate feed line is preferably positioned far upstream of the gas outlet of the mixing region.

2) The back flow tends to be prevented if the high-flow-rate line for the gas having a greater molecular weight is positioned nearer the gas outlet when the low-flow-rate line is positioned far from the gas outlet. Molecular weight is more important than flow rate in determining the relative positions of plural high-flow-rate lines.

3) A valve at the downstream side of a mass flow controller in the low-flow-rate line should preferably be of a type capable of delivering gas at a relatively high velocity to the mixing region.

4) The highest-flow-rate line should be aligned with the outlet from the mixing region, as shown in FIG. 8.

5) The piping joining the downstream side of the valve in the low-flow-rate line to the mixing region should have a large piping ratio L/D.

Figure 1:
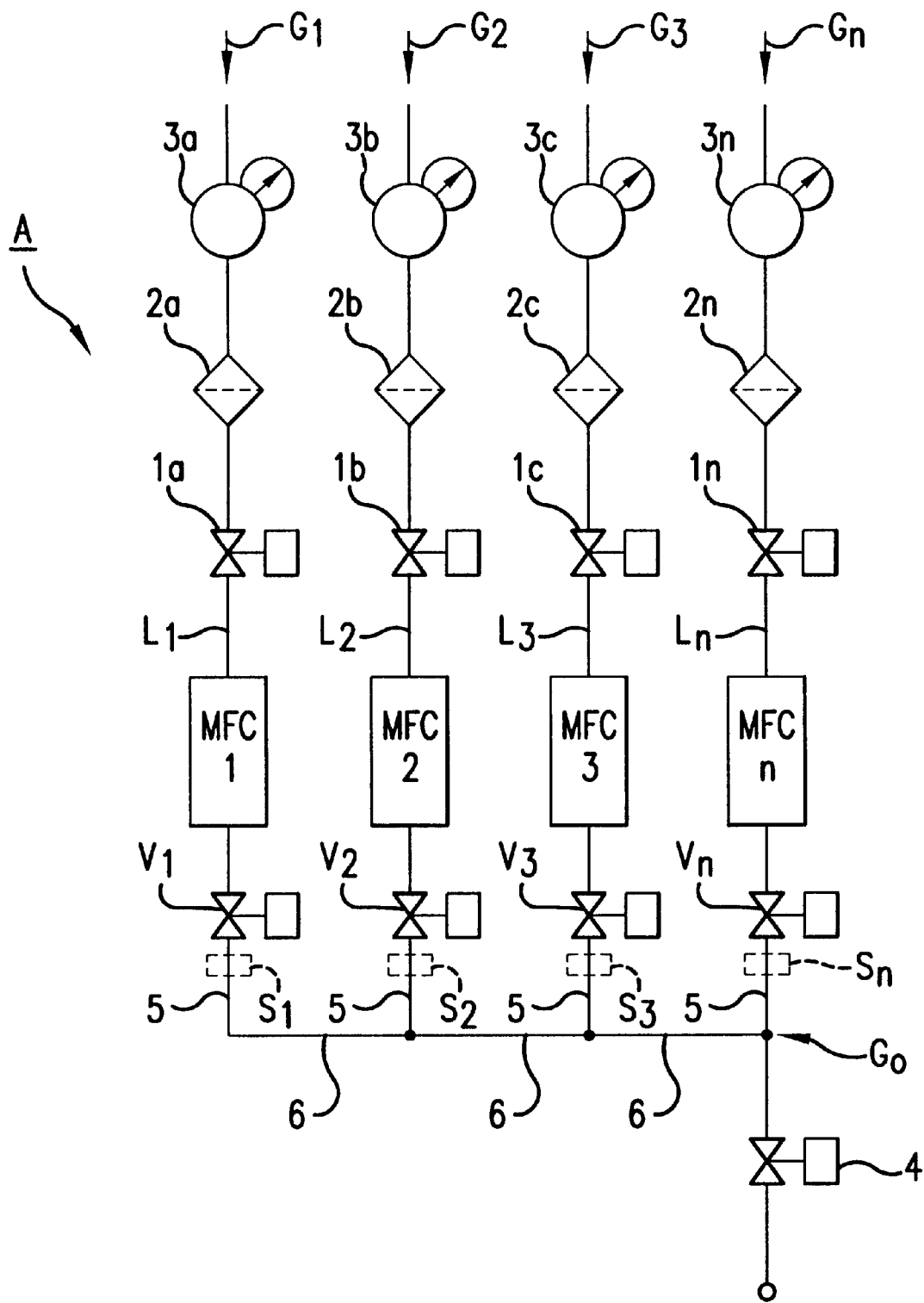
FIG. 1 shows apparatus for mixing and feeding gases according to the present invention.

FIG. 1 schematically illustrates a preferred embodiment of the invention. An apparatus A for mixing and feeding a plurality of gases $G_1$, $G_2$, $G_3$ ... $G_n$ comprises a plurality of gas feed lines $L_1$, $L_2$, $L_3$ ... $L_n$ for feeding the gases to a mixing region 6 having the form of a branched tube or pipe with branches 5 and gas outlet Go. Gas feed line $L_1$ has therein a pressure regulator 3a, a filter 2a, a valve 1a, a mass flow controller $MFC_1$ and a valve $V_1$, arranged in series in a downstream direction. Gas feed lines $L_2$, $L_3$, ... $L_n$ are provided with like elements.

The gas outlet Go is connected through a valve 4 to an apparatus (not shown) which uses the mixture of gases exiting from outlet Go in the production of semiconductors.

The flow rates of the gases are controlled by the mass flow controllers to obtain the mixture of gases required in the semiconductor production process. Gases $G_1$ ... $G_n$ are applied through feed lines $L_1$ ... $L_n$ to the mixing region 6 according to the mass flow rates necessary to obtain a required gas mixture. Gas $G_1$, having the lowest flow rate, is applied to feed line $L_1$ which connects to the mixing region 6 at a point further from outlet Go that any other line. Gas $G_2$, having a required flow rate greater than that of gas $G_1$, but less than the flow rates of gases $G_3$ ... $G_n$, is applied to feed line $L_2$, and so on, with the gas $G_n$ having the highest required flow rate being applied to line $L_n$ which is connected to the mixing region at a location closer than any other feed line to outlet Go.

If there are two (or more) high-flow-rate gases with almost the same flow rate, the gas having the higher molecular weight is applied to a gas feed line which is further from the lowest-flow-rate line $L_1$ than the gas having the lower molecular weight.

Thus, according to a first method, the lowest-feed rate gas is always applied to feed line $L_1$, with feed lines $L_2$ ... $L_n$ receiving gases according to increasing flow rates, but if two or more gases applied to lines $L_2$ ... $L_n$ are to have the same flow rate then, as between the gases with the same flow rates, the gas with the lowest molecular weight is applied to the gas feed line which is closer to line $L_1$.

According to a second method, the lowest-flow-rate gas is applied to line $L_1$ which is farthest from outlet Go and the remaining gases are applied to lines $G_2$ ... $G_n$ according to a product value obtained by multiplying the desired feed rate for each gas by its molecular weight, the gas with the highest product value being applied to feed line $L_n$.

The gases $G_1$ ... $G_n$ may be any gases used in semiconductor production including, but not limited to HCL, $CL_2$, $H_2S$, $SF_4$, $SiH_4$, He, Ar, $H_2$, $O_2$, and $N_2$.

The piping is preferably arranged as shown in FIG. 1 so that the branch tube 5, which connects the highest-flow-rate gas feed line $L_n$ to the mixing region, is directly opposite the gas outlet Go. That is, the piping connecting outlet Go to the valve V4 is arranged in a straight line with the branch 5, at least where the piping joins the mixing region.

If the inner diameters of all the gas feed lines $L_1$ to $L_n$ are made equal, the velocities of the gases passing through the lines vary from gas to gas. On the other hand, the experiments described previously indicate that the back flow from the high-flow-rate feed lines into the low-flow-rate feed line can be prevented more completely by making the gas flow velocities equal in each line. Therefore, each feed line is preferably provided with an orifice apparatus $S_1$–$S_n$ such that the ratio Q/S is almost equal for each of the feed lines $L_1$ to $L_n$ where Q is the flow rate in a line and S is the passage sectional area of the orifice in that line.

Figure 2:
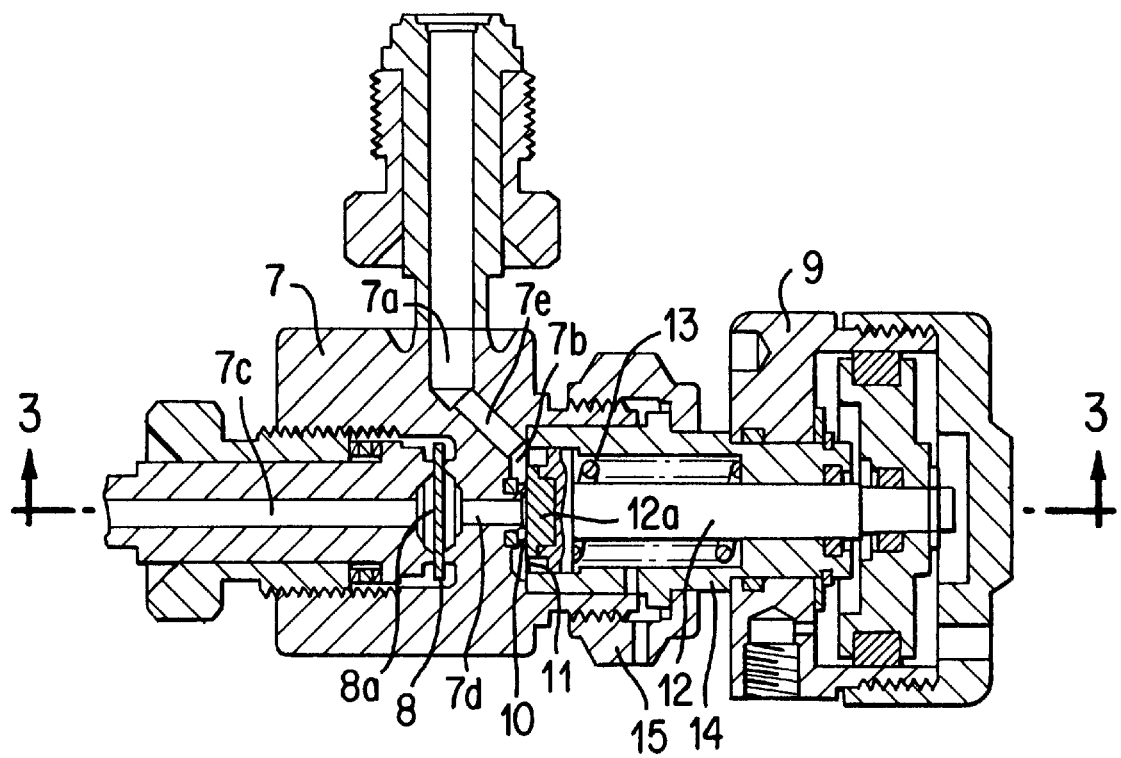
FIG. 2 is a sectional view of a first embodiment of a back-flow-preventing valve suitable for use in a gas feed line.
Figure 3:
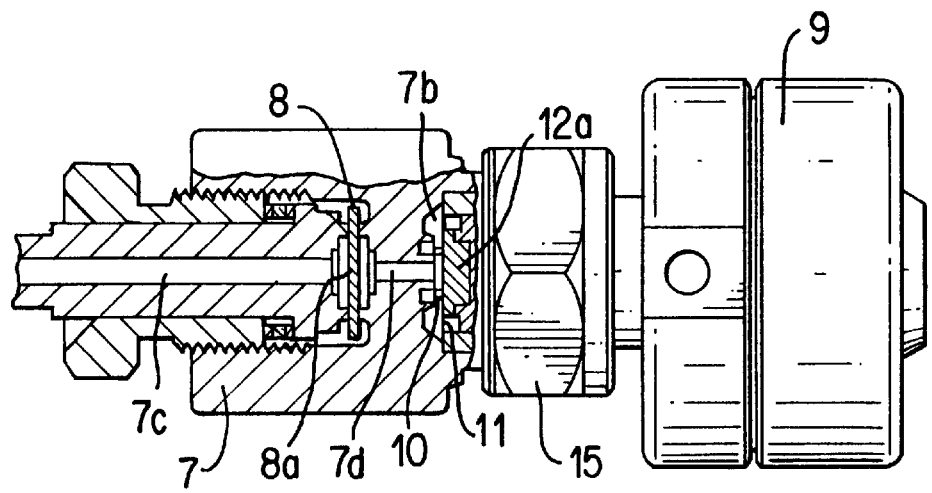
FIG. 3 is a part-sectional view of the valve taken along the line T—T of FIG. 2.

FIGS. 2 and 3 are sectional views of a back flow preventing valve suitable for use as the valve $V_1$ in the gas feed line $L_1$ for the lowest-flow-rate gas. The valve comprises a main valve body 7 made of a corrosion-resistant steel such as stainless steel. Body 7 is provided with a gas inlet passage 7a for receiving flow from $MFC_1$, a valve chamber 7b, a gas outlet passage 7c for applying gas to the mixing region 6, and gas passages 7d and 7e.

An orifice gasket 8, having an orifice opening or pore 8a therein, is disposed between valve chamber 7b and the outlet 7c. As gas exits the chamber 7b, its velocity increases as it passes through pore 8a. Thus, the gasket 8 implements the orifice apparatus $S_1$, shown in FIG. 1.

Within chamber 7b is a flexible stainless steel diaphragm 11. A spring 13, acting via a diaphragm presser 12, deforms diaphragm 11 so that it moves into contact with a valve seat 10, thereby cutting off gas flow from inlet 7a, through the chamber 7b to the outlet 7c. A valve driving unit 9 retracts shaft 12 against the force of spring 13. This permits the flexible diaphragm 11 to return to its initial state, thereby allowing gas flow from inlet 7a to outlet 7c through chamber 7b. The peripheral region of the diaphragm 11 is fixed in an air-tight manner to the body 7 by a bonnet 14 and bag nut 15. Valve driving unit 9 may be an air cylinder type driving device or it may be an electrically or hydraulically actuated driving unit.

Preferably, the capacity or volume of the gas passages 7d, 7e, etc. of the valve is made as a small as possible to improve purging or replacement of the gas. Furthermore, the piping ratio L/D of the branched tube 5 is made as large as possible, where L is the length of the branch and D is the inside diameter of the branch.

The back flow preventing valve shown in FIGS. 2 and 3 is primarily for use as the valve $V_1$ in the lowest-flow-rate gas feed line $L_1$ of the apparatus shown in FIG. 1. It serves to prevent backflow of higher-flow-rate gases $G_2$ to $G_n$ into the lowest-flow-rate gas $G_1$ by raising the velocity of the gas $G_1$ as it passes through the opening 8a of restricted section in the gasket 8.

The back flow preventing valve of FIGS. 2 and 3, in addition to being used as the valve $V_1$, may also be used as the valves $V_2$ to $V_n$ in the branched tubes 5 for the higher-flow-rate gases.

Figure 4:
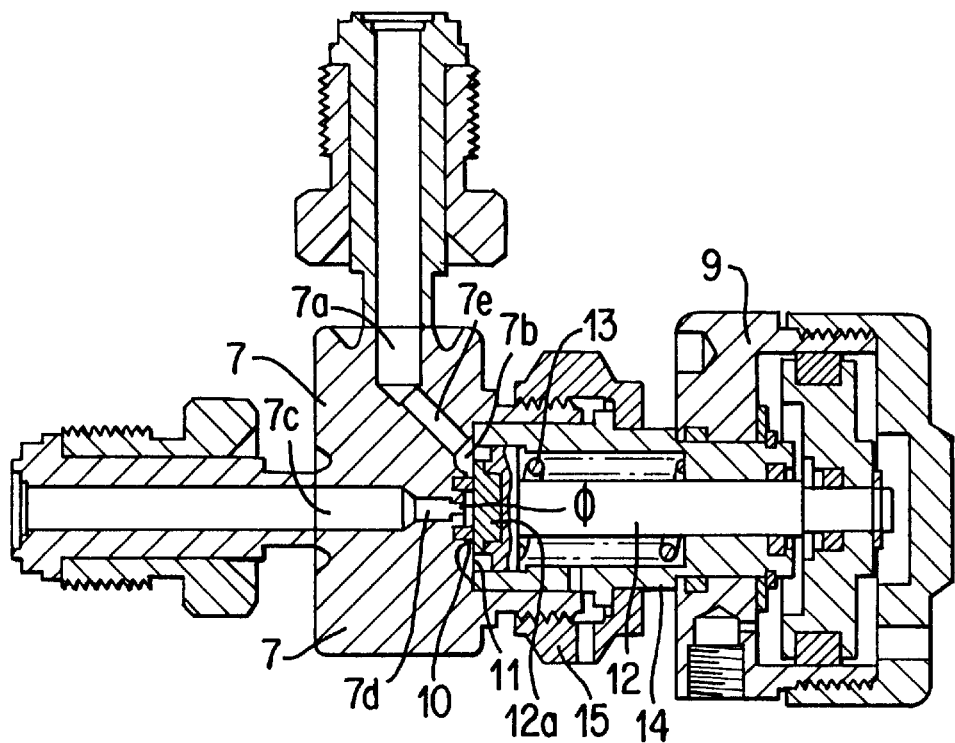
FIG. 4 is a sectional view of a second embodiment of a back-flow-preventing valve suitable for use in a gas feed line.

FIG. 4 shows a second embodiment of a back flow preventing valve suitable for use as the valve $V_1$ in FIG. 1. In this embodiment, the end of gas passage 7d which joins chamber 7b is formed with a restricted passage or neck 7d having an inside diameter $\phi$ of about 0.2 to 2.0 mm. The neck need not be more than about 1.0 mm in length. The restricted passage serves to increase the velocity of gas flowing therethrough to effectively prevent back flow into the valve from other gas feed lines having larger mass flow rates.

Figure 5:
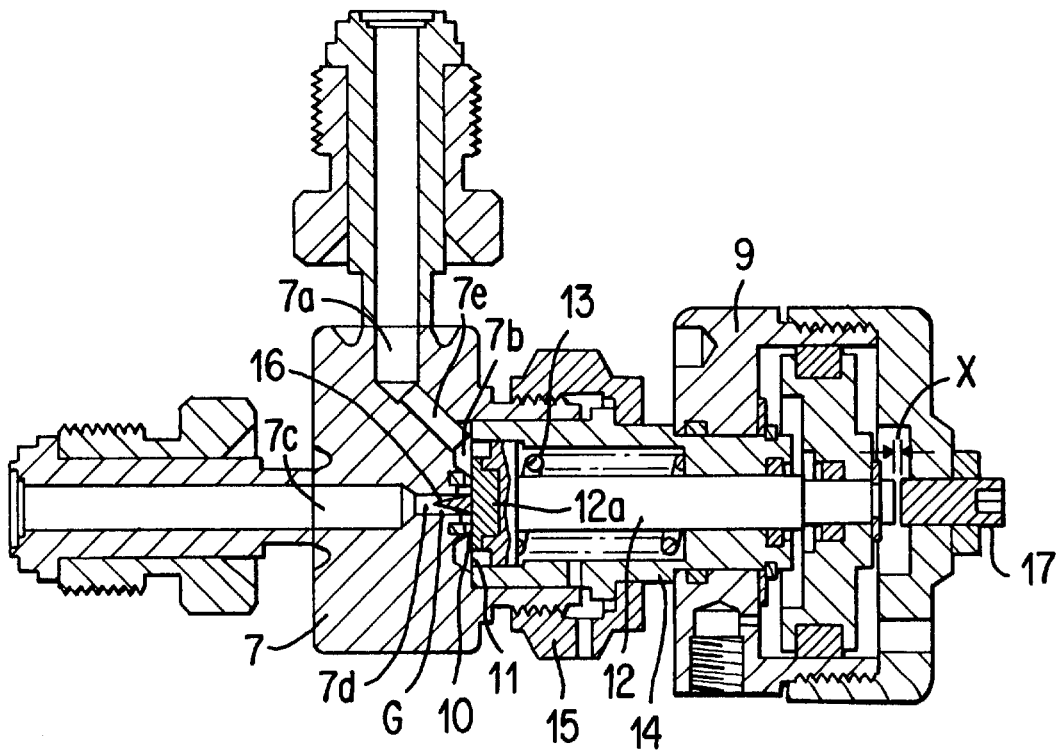
FIG. 5 is a sectional view of a third embodiment of a back-flow-preventing valve suitable for use in a gas feed line.

FIG. 5 illustrates a third embodiment of a back flow preventing valve suitable for use as the valve $V_1$ in FIG. 1. In this embodiment, a needle or needle-like element 16 is welded to the valve diaphragm 11 with the free or pointed end of the needle extending into fluid passage 7d. The case body of the driving unit 9 is provided with a stroke control screw 17, and the operating stroke X of shaft 12 is regulated by adjusting the position of the control screw. This, in turn, controls the extent to which the needle point extends into the passage 7d when the valve is opened to permit flow of gas from inlet passage 7a to outlet passage 7c. Thus, the gap G between the needle point and the wall of passage 7d when the valve is open may be regulated depending on the flow rate $Q_1$ of the gas flowing in the lowest-flow-rate gas feed line $L_1$.

From the foregoing description it is seen that the present invention provides a gas mixing and feeding method and apparatus which effectively eliminates back flow or diffusion of higher-flow-rate gases into the feed line carrying the lowest-flow-rate gas. As a result, fewer problems are caused in valves and mass flow controllers in the lowest-flow-rate gas feed line.

In addition, a touch type diaphragm valve is provided at least in the lowest-flow-rate line, the valve having a passage of restricted section for increasing the velocity of the lowest-flow rate gas, thereby completely eliminating back flow into the lowest-flow-rate line. Thus, the mixing and feeding apparatus of the present invention is admirably suited for trouble-free use in continuously and smoothly feeding a mixture of gases in a semiconductor manufacturing process.

Although preferred embodiments of the invention have been described to illustrate the principles of the invention, it will be understood that various modifications and substitutions may be made in the described embodiments without departing from the spirit and scope of the invention as defined by the appended claims.

We claim:

1. An apparatus for mixing at least three gases flowing at different mass flow rates and having different molecular weights and feeding the resulting mixture of gases to a gas outlet (Go) in a semiconductor manufacturing apparatus, said apparatus comprising:

at least three gas feed lines (L1, L2, . . . Ln), each line feeding a respective one of said gases, each gas feed line being connected to a mixing region at a different distance from said gas outlet, with the gas feed line (Ln) feeding the gas having the highest product, of flow rate multiplied by molecular weight, being connected to said mixing region at a location nearer said gas outlet than any other of said feed lines are connected to said mixing region, and with the gas feed line (L1) feeding the gas having the lowest flow rate being further from said gas outlet than any other gas feed line, and a backflow prevention valve (V1) disposed in at least said feed line (L1) connected to said mixing region at a location farther from said gas outlet than where at least one other of said gas feed lines is connected to said mixing region, said valve comprising a valve body having therein an inlet passage, a gas chamber, an outlet passage, and a metallic diaphragm for selectively controlling the flow of a gas from said inlet passage to said outlet passage, wherein the nearest gas feed line (Ln) and the line leading from the gas outlet (Go) to the semiconductor manufacturing apparatus are arranged such that both said lines together form a straight line, and wherein said outlet passage is connected to said mixing region and comprises an orifice gasket, replaceably disposed in said valve outlet passage to reduce the sectional area of said valve outlet passage, in order to increase the velocity of gas passing through said outlet passage to said mixing region.

2. An apparatus for mixing at least three gases flowing at different mass flow rates and having different molecular weights and feeding the resulting mixture of gases to a gas outlet (Go) in a semiconductor manufacturing apparatus, said apparatus comprising:

at least three gas feed lines (L1, L2, . . . Ln), each line feeding a respective one of said gases, each gas feed line being connected to a mixing region at a different distance from said gas outlet, with the gas feed line (Ln) feeding the gas having the highest product, of flow rate multiplied by molecular weight, being connected to said mixing region at a location nearer said gas outlet than any other of said feed lines are connected to said mixing region, and with the gas feed line (L1) feeding the gas having the lowest flow rate being further from said gas outlet than any other gas feed line, and a backflow prevention valve (V1) disposed in at least said feed line (L1) connected to said mixing region at a location farther from said gas outlet than where at least one other of said gas feed lines is connected to said mixing region, said valve comprising a valve body having therein an inlet passage, a gas chamber, an outlet passage, and a metallic diaphragm for selectively controlling the flow of a gas from said inlet passage to said outlet passage, wherein the nearest gas feed line (Ln) and the line leading from the gas outlet (Go) to the semiconductor manufacturing apparatus are arranged such that both said lines together form a straight line, and wherein said outlet passage is connected to said mixing region and comprises a needle, fixed on said diaphragm and insertable into said outlet passage, to reduce the sectional area for gas flow through said outlet passage in order to increase the velocity of gas passing through said outlet passage to said mixing region.

3. The apparatus of claims 1 and 2, wherein, of the remaining gas or gases, other than the gas with the lowest flow rate and the gas having the highest product obtained by multiplying the molecular weight of each gas by its respective flow rate, the gas that has the highest flow rate of the remaining gases is provided through the line, of the feed lines for the remaining gas or gases, that is closest to the outlet (Go).

4. The apparatus of one of claims 1 and 2, wherein, of the remaining gas or gases, other than the gas with the lowest flow rate and the gas having the highest product obtained by multiplying the molecular weight of each gas by its respective flow rate, the gas that has the highest such product of the remaining gases is provided through the line, of the feed lines for the remaining gas or gases, that is closest to the outlet (Go).

* * * * *